United States Patent
Sasayama et al.

(10) Patent No.: US 12,195,051 B2
(45) Date of Patent: Jan. 14, 2025

(54) VEHICLE DRIVING MODE SWITCHING CONTROL METHOD AND VEHICLE DRIVING MODE SWITCHING CONTROL DEVICE

(71) Applicant: Nissan Motor Co., Ltd., Yokohama (JP)

(72) Inventors: Takashi Sasayama, Kanagawa (JP); Yoshikazu Sakai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/580,207

(22) PCT Filed: Jul. 19, 2021

(86) PCT No.: PCT/JP2021/027026
§ 371 (c)(1),
(2) Date: Jan. 18, 2024

(87) PCT Pub. No.: WO2023/002543
PCT Pub. Date: Jan. 26, 2023

(65) Prior Publication Data
US 2024/0326876 A1    Oct. 3, 2024

(51) Int. Cl.
*B60W 60/00* (2020.01)
*B60W 50/14* (2020.01)

(52) U.S. Cl.
CPC ........ *B60W 60/0055* (2020.02); *B60W 50/14* (2013.01); *B60W 2540/223* (2020.02)

(58) Field of Classification Search
None
See application file for complete search history.

(56) References Cited

U.S. PATENT DOCUMENTS

| | | |
|---|---|---|
| 2012/0296528 A1 | 11/2012 | Wellhoeffer et al. |
| 2016/0207538 A1* | 7/2016 | Urano ............... G05D 1/0278 |
| 2020/0216079 A1 | 7/2020 | Mahajan |

FOREIGN PATENT DOCUMENTS

| | | |
|---|---|---|
| JP | 2018-30495 A | 3/2018 |
| JP | 2018-116429 A | 7/2018 |

(Continued)

OTHER PUBLICATIONS

Extended European Search Report of Aug. 9, 2024 of corresponding European Patent Application No. 21950372.9.

*Primary Examiner* — James J Lee
*Assistant Examiner* — Andrew Sang Kim
(74) *Attorney, Agent, or Firm* — Global IP Counselors, LLP

(57) ABSTRACT

A vehicle driving mode switching control method is provided to switch from a driving assist mode in which a driving operation performed by a driver is assisted by autonomous travel control having a plurality of assist levels to a manual driving mode in which the driver performs the driving operation. The vehicle driving mode switching control method sets a threshold value higher for a driving assist mode in which the assist level is relatively high than for a threshold value of a driving assist mode in which the assist level is relatively low. The vehicle driving mode switching control method detects an input value from the driver with respect to a steering wheel of a host vehicle, and switches from the driving assist mode to the manual driving mode when the input value from the driver is equal to or greater than the threshold value.

8 Claims, 14 Drawing Sheets

(56) References Cited

FOREIGN PATENT DOCUMENTS

| | | | |
|---|---|---|---|
| JP | 2019-172112 | A | 10/2019 |
| JP | 2019-172239 | A | 10/2019 |
| JP | 2019-175208 | A | 10/2019 |

\* cited by examiner

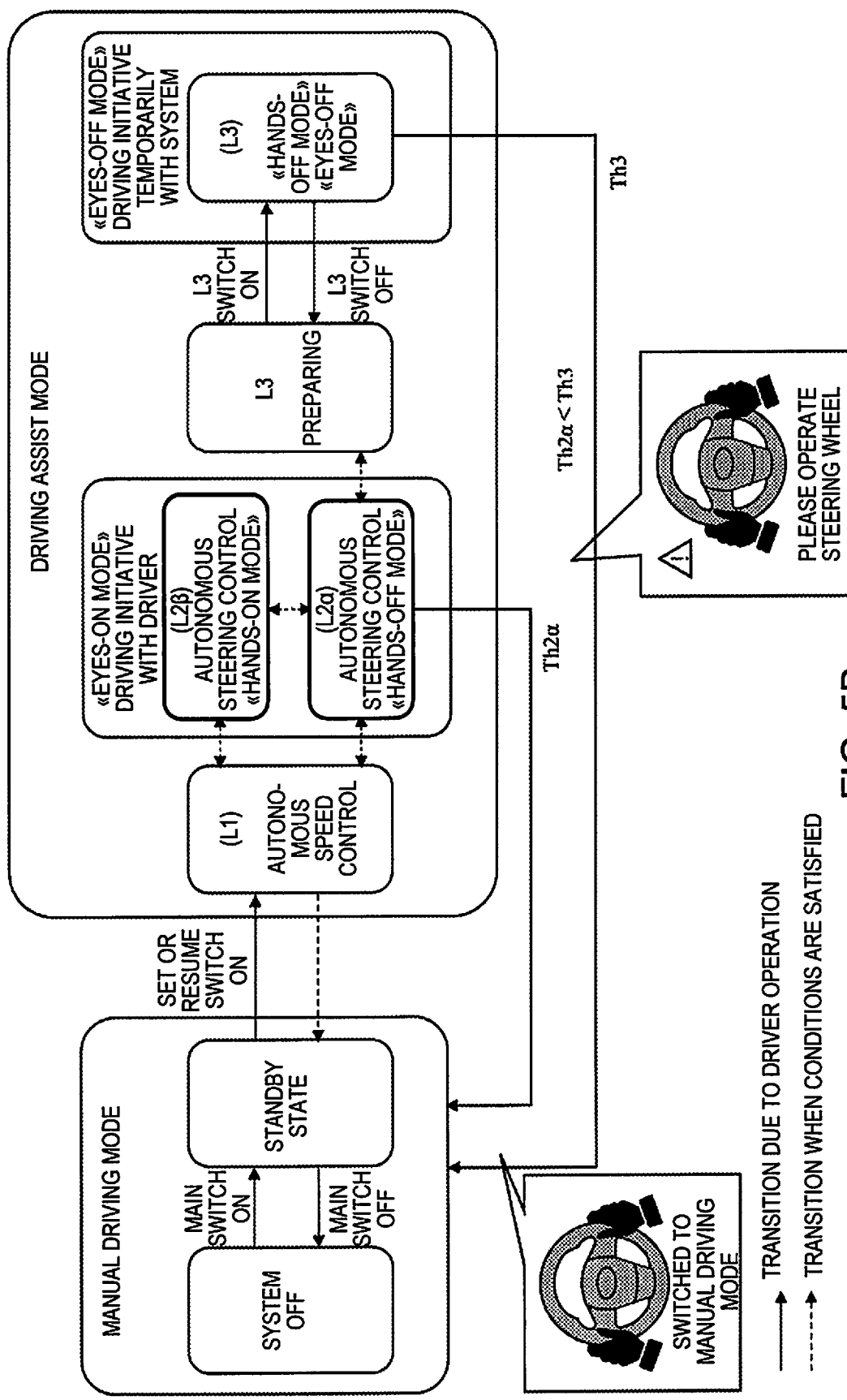

VEHICLE DRIVING MODE SWITCHING CONTROL METHOD AND VEHICLE DRIVING MODE SWITCHING CONTROL DEVICE

CROSS-REFERENCE TO RELATED APPLICATIONS

This application is a U.S. national stage application of International Application No. PCT/JP2021/027026, filed on Jul. 19, 2021.

BACKGROUND

Technical Field

The present invention relates to a vehicle driving mode switching control method and a vehicle driving mode switching control device.

Background Information

There are known driving assist systems in which, during automated driving in which a first driving assist mode that requires a driver to hold a steering wheel and a second driving assist mode that does not require the driver to hold the steering wheel, steering override is determined only when it has been detected that the steering wheel is being gripped by the driver and steering torque is equal to or greater than a preset threshold value, and a transition is made from automated driving in the first driving assist mode or the second driving assist mode to manual driving mode, in which the driver manually drives the vehicle (refer to Patent Citation 1: Japanese Laid-open Patent Application No. 2019-175208).

SUMMARY

However, with the background-art driving assist system described above, there is determined to be an override due to the same conditions whether the mode is the first driving assist mode or the second driving assist mode, and issues have therefore been encountered, such as the transition to manual driving mode not being smooth, and conversely, detection being erroneous. Therefore, it is preferable to perform the override determination in accordance with a travel assist level.

A problem to be solved by the invention is to provide a vehicle driving mode switching control device method and a vehicle driving mode switching control device in which an override determination can be performed according to a travel assist level.

The present invention is a vehicle driving mode switching control method, in which autonomous travel control having a plurality of assist levels causes a switch from a driving assist mode, in which a driving operation performed by a driver is assisted, to a manual driving mode, in which the driver performs the driving operation, wherein a threshold value of a driving assist mode in which the assist level is relatively high is set higher than a threshold value of a driving assist mode in which the assist level is relatively low. The problem described above is solved by detecting an input value from the driver with respect to a steering wheel of a host vehicle and switching from the driving assist mode to the manual driving mode when the input value from the driver is equal to or greater than a threshold value.

According to the present invention, it is possible to perform an override determination that corresponds to a travel assist level.

BRIEF DESCRIPTION OF THE DRAWINGS

Referring now to the attached drawings which form a part of this original disclosure:

FIG. 5B is a diagram of an example of a display screen displayed in the vehicle when a state transition of FIG. 4 is executed;

DETAILED DESCRIPTION OF EMBODIMENTS

Figure 1:
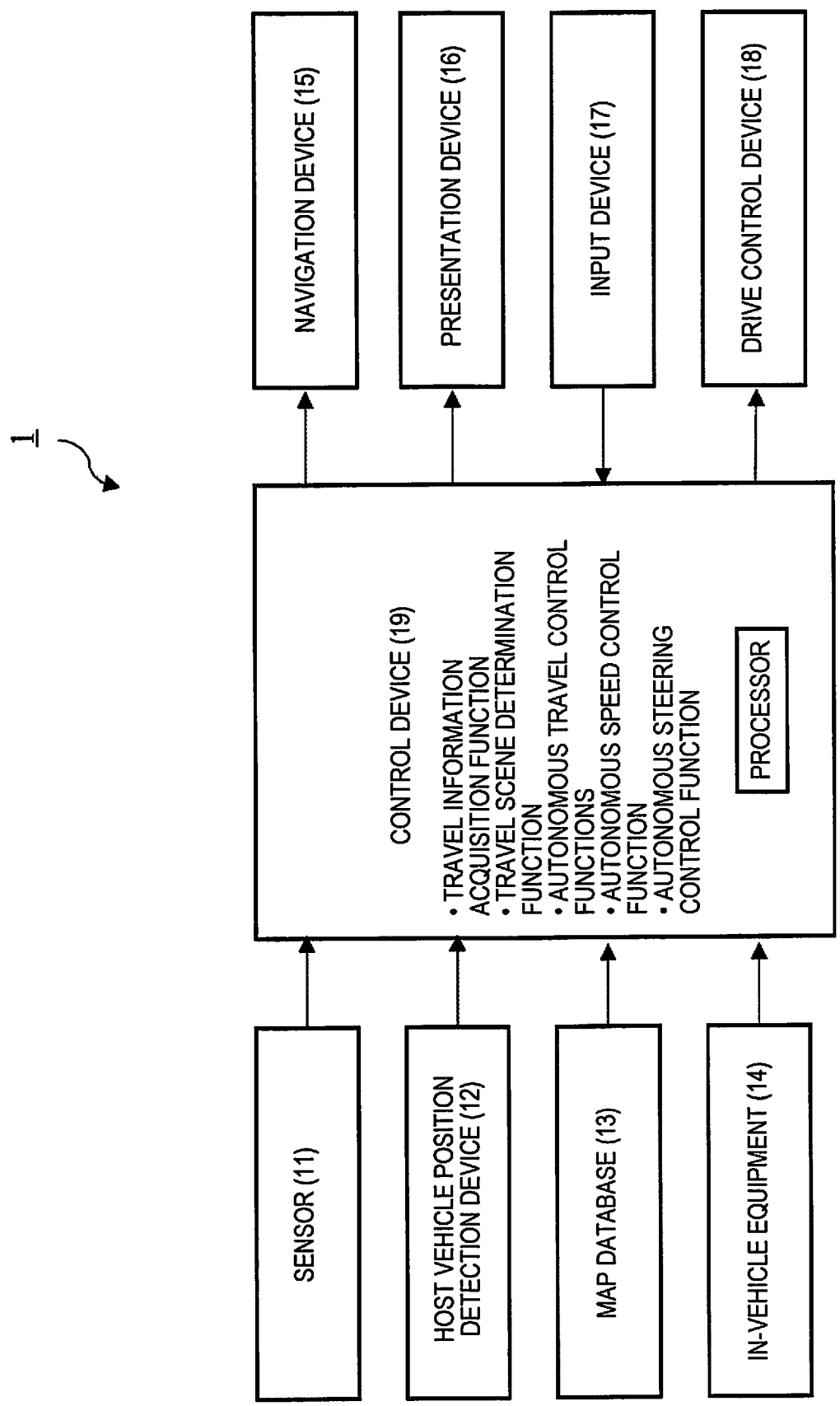
FIG. 1 is a block diagram of one embodiment of a vehicle driving mode switching control device of the present invention.

An embodiment of the invention is described below on the basis of the drawings. FIG. 1 is a block diagram of a configuration of a vehicle driving mode switching control device 1 according to the present embodiment. The driving mode switching control device 1 of the present embodiment is also one embodiment that embodies a vehicle driving mode switching control method according to the present invention.

The driving mode switching control device 1 of the present embodiment comprises a sensor 11, a host vehicle position detection device 12, a map database 13, in-vehicle equipment 14, a navigation device 15, a presentation device 16, an input device 17, a drive control device 18, and a control device 19, as shown in FIG. 1. These devices are connected by, for example, a controller area network (CAN) or another onboard LAN, and are capable of exchanging information with each other.

The sensor 11 detects a travel state of the host vehicle. Possible examples of the sensor 11 include, inter alia, a forward camera that captures images of the area forward of the host vehicle, a rearward camera that that captures images of the area rearward of the host vehicle, a forward radar that detects obstacles forward of the host vehicle, a rearward radar that detects obstacles rearward of the host vehicle, a side radar that detects obstacles present on the left and right sides of the host vehicle, a vehicle speed sensor that detects a vehicle speed of the host vehicle, a touch sensor (capacitive sensor) that detects whether or not the driver is holding the steering wheel, and an interior camera that captures images of the driver. One of the plurality of abovementioned sensors may be used as the sensor 11, or a combination of two or more sensors may be used. A detection result from the sensor 11 is outputted to the control device 19 at predetermined time intervals.

The host vehicle position detection device 12 comprises a GPS unit, a gyro sensor, a vehicle speed sensor, etc. The host vehicle position detection device 12 detects radio waves transmitted from a plurality of satellite communications using the GPS unit, and periodically acquires position information for a target vehicle (the host vehicle). In addition, the host vehicle position detection device 12 detects a current position of the target vehicle on the basis of the acquired position information for the threshold value, angle change information acquired from the gyro sensor, and the vehicle speed acquired from the vehicle speed sensor. The position information for the target vehicle detected by the host vehicle position detection device 12 is outputted to the control device 19 at predetermined time intervals.

The map database 13 is a memory that stores three-dimensional high-precision map information including information on the positions of various facilities and specific locations, and that can be accessed from the control device 19. The three-dimensional high-precision map information is map information in which information on curved roads, the sizes of curves thereof (e.g., curvature or radius of curvature), and detailed and high-precision positional information, such as that of road junctions, branching points, toll plazas, and locations where the number of lanes is reduced, is associated with map information as three-dimensional information.

The in-vehicle equipment 14 is a variety of equipment installed in the vehicle, and is actuated through driver operation. Examples of such in-vehicle equipment include a steering wheel, an accelerator pedal, a brake pedal, direction indicators, wipers, lights, a horn, and other specific switches. When the in-vehicle equipment 14 is operated by the driver, related operation information is outputted to the control device 19.

The navigation device 15 acquires current position information for the host vehicle from the host vehicle position detection device 12, superimposes the position of the host vehicle over map information for guidance, and displays the result on a display or the like. In addition, a function of the navigation device 15 is, when the driver inputs a destination, to calculate a route to the destination and guide the driver along the set route. Using this navigation function, the navigation device 15 displays a route to the destination on the map of the display and notifies the driver of recommended travel actions on the route by voice or the like.

The presentation device 16 includes various displays such as the display provided to the navigation device 15, a display built into a rearview mirror, a display built into a meter part, and a head-up display projected onto the windshield. In addition, the presentation device 16 includes devices other than displays, such as a speaker of an audio device and a seat device having a vibrating body embedded therein. The presentation device 16 informs the driver of various presentation information under the control of the control device 19.

Figure 2:
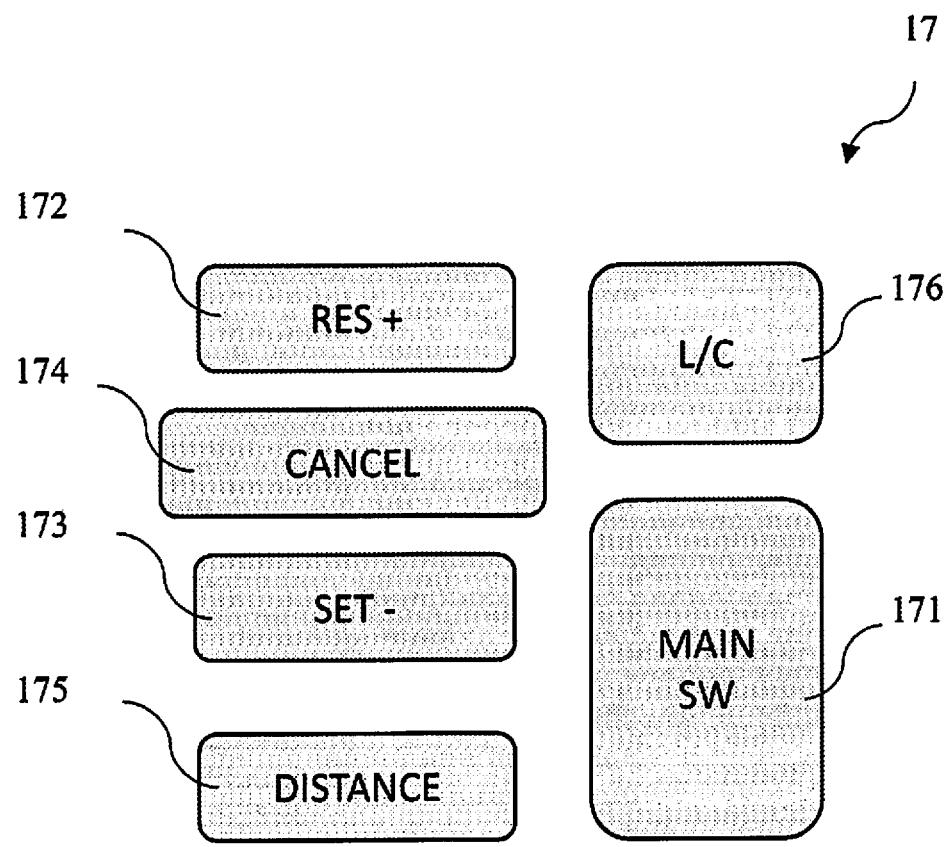
FIG. 2 is a front view of part of an input device of FIG. 1.

The input device 17 is a device such as, for example, a button switch that allows manual input by the driver, a touch panel placed on a display screen, or a microphone that allows voice input by the driver. In the present embodiment, the driver can operate the input device 17 to input settings information for presentation information presented by the presentation device 16. FIG. 2 is a front view of part of the input device 17 of the present embodiment, showing an example of a group of button switches placed in a location such as a spoke of the steering wheel.

The input device 17 shown is a button switch used to set autonomous travel control functions (an autonomous speed control function and an autonomous steering control function) of the control device 19 to ON, OFF, etc. The input device 17 of the present embodiment comprises a main switch 171, a resume acceleration switch 172, a set coast switch 173, a cancel switch 174, a vehicle-to-vehicle adjustment switch 175, and a lane change assist switch 176.

The main switch 171 is a switch that turns ON and OFF a power source of a system that realizes the autonomous speed control function and the autonomous steering control function of the control device 19. The resume acceleration switch 172 is a switch for, inter alia, restarting the autonomous speed control function after the autonomous speed control function was stopped (OFF) to a pre-OFF set speed raising the set speed, and causing the host vehicle to set off again under control of the control device 19 after the host vehicle has stopped following a preceding vehicle. The set coast switch 173 is a switch that, inter alia, starts the autonomous speed control function at a traveling speed and lowers the set speed. The cancel switch 174 is a switch that turns OFF the autonomous speed control function. The vehicle-to-vehicle adjustment switch 175 is a switch for setting a vehicle-to-vehicle distance to the preceding vehicle, e.g., a switch that selects one from a plurality of setting levels including short distance, medium distance, and long distance. The lane change assist switch 176 is a switch for indicating (approving) a start of a lane change when the control device 19 confirms the start of a lane change with the driver. After the start of the lane change has been approved, the approval of the lane change proposal by the control device 19 can be canceled by pressing the lane change assist switch 176 for longer than a predetermined time.

In addition to the group of button switches shown in FIG. 2, a direction-indicating lever of a direction indicator or a switch of other in-vehicle equipment 14 can be used as the input device 17. Another possible configuration is, for example, when the control device 19 proposes whether or not to perform a lane change under autonomous control, the driver inputs approval or permission to change lanes by turning on the switch of a direction indicator. Another possible configuration is, when the control device 19 proposes whether or not to perform a lane change under autonomous control and the driver operates a direction-indicating lever, the lane change performed is not the proposed lane change, but a lane change toward the direction in which the direction-indicating lever was operated. Settings information input via the input device 17 is outputted to the control device 19.

The drive control device 18 controls host vehicle travel. For example, when the host vehicle travels steadily at the set speed under the autonomous speed control function, the drive control device 18 controls actuation of a drive mechanism (including actuation of an internal combustion engine in an engine automotive vehicle, actuation of a travel motor in an electric automotive vehicle, and torque distribution between the internal combustion engine and the travel motor in a hybrid automotive vehicle) and brake actuation in order to maintain acceleration, deceleration, and travel speed so that the host vehicle reaches the set speed. In addition, when the host vehicle is following the preceding vehicle under the autonomous speed control function, the drive control device 18 controls the actuation of the drive mechanism and brake actuation for realizing an acceleration speed and travel speed so that the vehicle-to-vehicle distance between the host vehicle and the preceding vehicle remains constant.

Under the autonomous steering control function, the drive control device 18 executes steering control for the host vehicle by controlling actuation of a steering actuator in addition to controlling the actuation of the drive mechanism and the brake as described above. For example, when executing lane-keeping control under the autonomous steering control function, the drive control device 18 detects lane markers in a host vehicle lane in which the host vehicle is traveling, and controls a width-direction travel position of the host vehicle so that the host vehicle travels in a predetermined position in the host vehicle lane. In addition, when executing lane change assist under a lane change assist function (described hereinafter), the drive control device 18 controls the width-direction travel position of the host vehicle so that the host vehicle changes lanes. Furthermore, when executing right/left turning assist under the autonomous steering control function, the drive control device 18 performs travel control for turning right or left at an intersection or the like. The drive control device 18 controls host vehicle travel according to an indication from the control device 19 (described hereinafter). In addition, other known methods can also be used as the method by which the drive control device 18 controls travel.

The control device 19 comprises, inter alia, a read only memory (ROM) storing programs for controlling host vehicle travel, a central processing unit (CPU) that executes the programs stored in the ROM, and a random access memory (RAM) that functions as an accessible storage device. Other components that can be used as actuation circuits, instead of or in addition to the central processing unit (CPU), include, inter alia, a micro processing unit (MPU), a digital signal processor (DSP), an application specific integrated circuit (ASIC), and a field programmable gate array (FPGA).

By using the CPU to execute the programs stored in the ROM, the control device 19 realizes a travel information acquisition function of acquiring information pertaining to a travel state of the host vehicle, a travel scenario determination function of determining a travel scenario of the host vehicle, and an autonomous travel control function of autonomously controlling the travel speed and/or steering of the host vehicle. The functions of the control device 19 shall be described below.

The travel information acquisition function of the control device 19 is a function for the control device 19 to acquire travel information pertaining to the travel state of the host vehicle. For example, the control device 19 acquires, as travel information, image information for the host vehicle exterior imaged by the forward camera, rearward camera, and side cameras of the sensor 11. In addition, the control device 19 acquires, as travel information, detection results from the forward radar, rearward radar, and side radars. Furthermore, the control device 19 also acquires, as travel information, host vehicle speed information detected by the vehicle speed sensor of the sensor 11 and image information for the driver's face imaged by the interior camera.

Furthermore, the control device 19 acquires current position information for the host vehicle as travel information from the host vehicle position detection device 12. In addition, the control device 19 acquires the set destination and a route to the destination as travel information from the navigation device 15. Furthermore, the control device 19 acquires information on curved roads, the sizes of the curves thereof (e.g., curvature or radius of curvature), and position information such as that of junctions, branching points, toll plazas, and locations where the number of lanes is reduced, as travel information from the map database 13. Additionally, the control device 19 acquires information on operation of the in-vehicle equipment 14 by the driver as travel information from the in-vehicle equipment 14. What has been described above is the travel information acquisition function realized by the control device 19.

The travel scenario determination function of the control device 19 is a function of referring to a table stored in the ROM of the control device 19 to determine a travel scenario in which the host vehicle is traveling. In the table stored in the ROM of the control device 19, for example, travel scenarios suitable for changing lanes or overtaking and conditions for determining such scenarios are stored for each travel scenario. The control device 19 refers to the table stored in the ROM to determine whether or not the travel scenario of the host vehicle is, for example, a travel scenario suitable for changing lanes or overtaking.

Four conditions, namely, "preceding vehicle ahead," "preceding vehicle speed less than host vehicle set speed," "preceding vehicle to be reached within a predetermined time," and "lane-changing direction is not a lane-change-prohibiting condition," are set as determination conditions for "scenario of catching up to the preceding vehicle." In this case, the control device 19 assesses whether or not the host vehicle meets the above conditions on the basis of factors such as, for example, a detection result from the forward camera or forward radar included in the sensor 11, the host vehicle speed detected by the vehicle speed sensor, and position information for the host vehicle from the host vehicle position detection device 12. When the above conditions are met, the control device 19 determines that the host vehicle is in a "scenario of catching up to the preceding vehicle." What has been described above is the travel scenario determination function realized by the control device 19.

The autonomous travel control function of the control device 19 is a function for the control device 19 to autonomously control host vehicle travel without depending on the driver's operation. The autonomous travel control functions of the control device 19 include the autonomous speed control function by which the travel speed of the host vehicle is autonomously controlled, and the autonomous steering control function by which the steering of the host vehicle is autonomously controlled. The autonomous speed control function and the autonomous steering control function of the present embodiment shall be described below.

The autonomous speed control function is a function by which, when a preceding vehicle is detected, the vehicle speed set by the driver is designated as an upper limit and the host vehicle travels following the preceding vehicle while vehicle-to-vehicle control is performed so as to maintain a vehicle-to-vehicle distance that corresponds to the vehicle speed, and when no preceding vehicle is detected, the host vehicle travels steadily at the vehicle speed set by the driver. The former is referred to as vehicle-to-vehicle control and the latter is referred to as steady-speed control. The autonomous speed control function may include a function by which a speed limit of the road being traveled on is detected by the sensor 11 from a road sign or the speed limit is acquired from the map information of the map database 13 and the speed limit is automatically used as the set vehicle speed.

To activate the autonomous speed control function, the driver first inputs a desired travel speed by operating the resume acceleration switch 172 or the set coast switch 173 of the input device 17 shown in FIG. 2. For example, if the set coast switch 173 is pressed while the host vehicle is traveling at 70 km/h, the current travel speed will be set at that level, but if the speed desired by the driver is 80 km/h, the set speed may be raised by pressing the resume acceleration switch 172 multiple times. The symbol "+" provided to the resume acceleration switch 172 is to indicate that the switch will increase the set value. Conversely, if the speed desired by the driver is 60 km/h, the set speed may be lowered by pressing the set coast switch 173 multiple times. The symbol "−" provided to the set coast switch 173 is to indicate that the switch will reduce the set value. In addition, for the vehicle-to-vehicle distance desired by the driver, the vehicle-to-vehicle adjustment switch 175 of the input device 17 shown in FIG. 2 can be operated to select one from the multiple setting levels including, for example, short distance, medium distance, and long distance.

Steady-speed control, in which the host vehicle travels steadily at the speed set by the driver, is executed when the forward radar or the like of the sensor 11 has detected that there is no preceding vehicle forward in the host vehicle lane. In steady-speed control, actuation of drive mechanisms such as the engine and brake are controlled by the drive control device 18 while vehicle speed data provided by the vehicle speed sensor is fed back, so that the set travel speed is maintained.

Vehicle-to-vehicle control, in which the host vehicle travels following a preceding vehicle while vehicle-to-vehicle control is performed, is executed when the presence of a preceding vehicle forward in the host vehicle lane is detected by, inter alia, forward radar of the sensor 11. In vehicle-to-vehicle control, actuation of drive mechanisms such as the engine and brake are controlled by the drive control device 18 while vehicle-to-vehicle distance data detected by the forward radar is fed back, so that the set vehicle-to-vehicle distance is maintained with the set travel speed as an upper limit. When the preceding vehicle stops while the host vehicle is traveling under vehicle-to-vehicle control, the host vehicle also stops following the preceding vehicle. If the preceding vehicle sets off within, for example, 30 seconds of the host vehicle stopping, the host vehicle also sets off and following travel under vehicle-to-vehicle control is started again. When the host vehicle has been stopped for more than 30 seconds, the host vehicle does not automatically set off even if the preceding vehicle sets off, and following travel under vehicle-to-vehicle control is started again if the resume acceleration switch 172 is pressed or the acceleration pedal is pressed after the preceding vehicle has set off.

The autonomous steering control function is a function for executing steering control for the host vehicle by controlling the actuation of the steering actuator. The autonomous steering control function of the present embodiment includes, inter alia: (1) a lane-keeping function (vehicle-to-vehicle width direction maintenance function) of controlling steering and assisting the driver's steering wheel operation so that the host vehicle travels, for example, near the center of the lane; (2) a lane change assist function of controlling steering when the driver operates a blinker lever, and assisting steering wheel operation necessary for a lane change; (3) an overtaking assist function of controlling steering and assisting an overtaking operation when a vehicle slower than the set vehicle speed is detected ahead, a confirmation that the driver will perform an overtaking operation is made via the display, and the driver operates the approval switch; and (4) a route travel assist function of controlling steering and assisting a lane change when the driver has set a destination in the navigation device or the like, the host vehicle reaches a lane change point needed to travel along a route, a confirmation that the driver will perform a lane change is made via the display, and the driver operates the approval switch.

Figure 3:
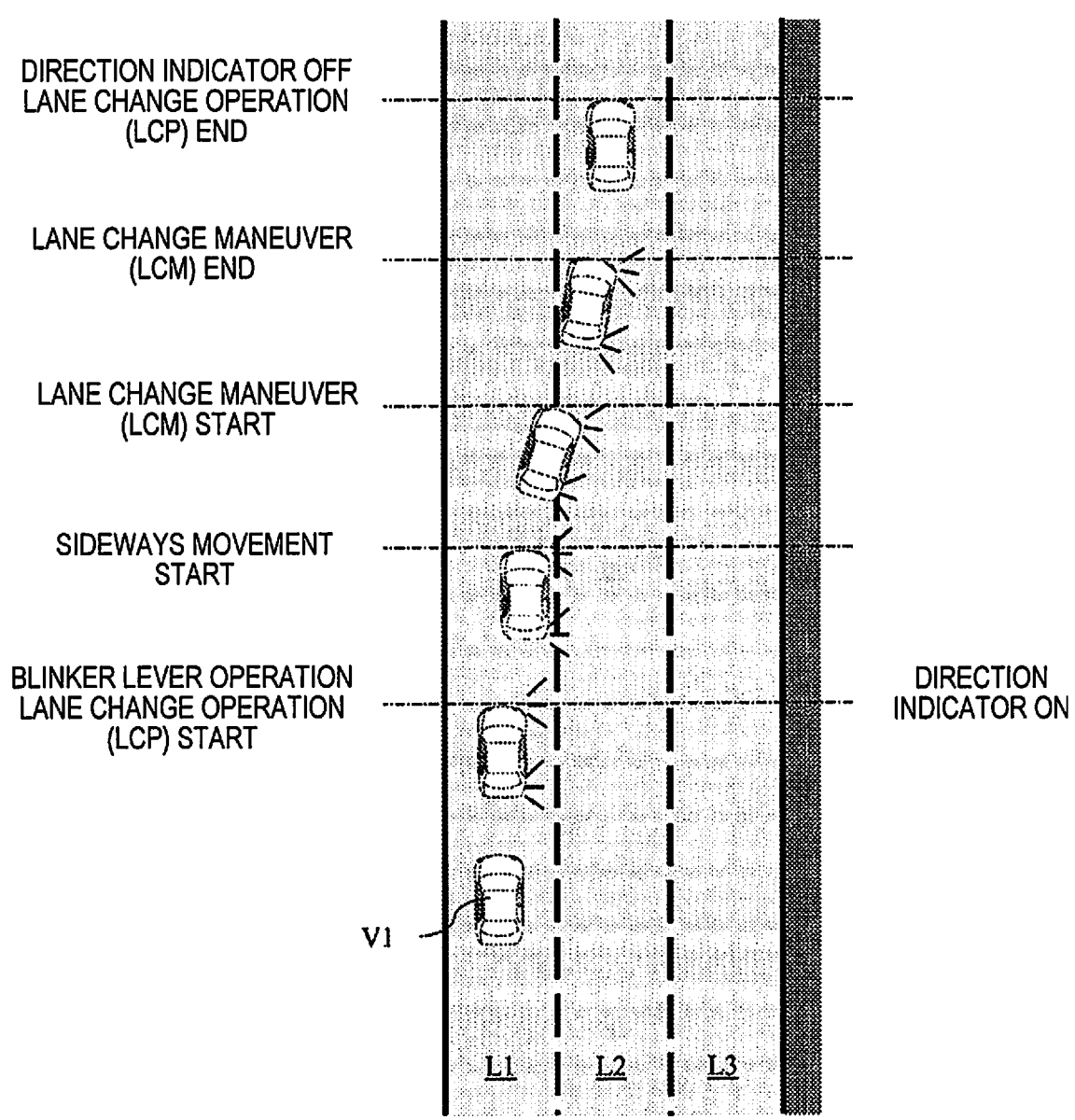
FIG. 3 is a plan view of an example of lane change control of the control device of FIG. 1.

The lane change assist function of the autonomous steering control function shall now be described. FIG. 3 is a plan view of an example of lane change control (the lane change assist function) executed by the control device 19 of the present embodiment. As shown in FIG. 3, when the driver operates a blinker lever of a host vehicle V1, the control device 19 causes a direction indicator to illuminate and starts a lane change operation (a series of autonomous lane change processes; hereinafter also referred to as "LCP") when preset lane change start conditions are met. The control device 19 determines whether the lane change start conditions are satisfied on the basis of various pieces of travel information acquired by the sensor 11. There are no particular limitations as to the lane change start conditions; one possible example is that all of the following conditions (1) to (8) be satisfied: (1) the vehicle is in a lane-keeping mode of a hands-on mode, (2) the vehicle is in a hands-on determination mode, (3) the vehicle is traveling at a speed of 60 km/h or higher, (4) there is a lane in a lane change direction, (5) there is enough space to allow a lane change in the lane to which the vehicle will change lanes, (6) the type of lane marker is such that a lane change is allowed, (7) the radius of curvature of the road is 250 m or more, and (8) 1 second has not yet passed since the driver has operated a direction indication lever. When the control device 19 assesses that the lane change start conditions are satisfied by the lane change assist function even 21 without an indication from the driver, the control device 19 may suggest a lane change to the driver by notifying the driver via the presentation device 16.

Of particular note is that the term "lane-keeping mode of a hands-on mode" refers to a state in which the autonomous speed control function and the lane-keeping function of the autonomous steering control function are being executed, and holding of the steering wheel by the driver is detected. The term "during hands-on determination" refers to a state in which the driver continues to hold the steering wheel.

When the lane change start conditions are met, the control device 19 starts a lane change operation LCP. The lane change operation LCP of the present embodiment, as shown in FIG. 3, includes sideways movement of the host vehicle V1 to an adjacent lane L2, and a lane change maneuver (hereinafter also referred to as "LCM) of actually moving to the adjacent lane L2. While executing the lane change operation LCP, the control device 19 presents information indicating that a lane change is being performed under autonomous control to the driver via the presentation device 16, and calls attention to the surroundings. When the lane change maneuver LCM is completed, the control device 19 extinguishes the direction indicator and starts an action such as executing the function of keeping the host vehicle in the adjacent lane L2. A lane change operation LCP refers to a period from when the direction indicator has been illuminated by operation of the blinker lever to when the direction indicator has been extinguished, and a lane change maneuver LCM refers to a period from when the host vehicle V1 begins to cross a boundary line between a host vehicle lane L1 and the adjacent lane L2 until the crossing is finished.

Of particular note is that a plurality of standards are set for the driving assist mode realized by the autonomous travel control function of the present embodiment. The term "driving assist mode" means a form or style of assistance in driving operation assist. In the present embodiment, the degree of assistance is referred to as the assist level. The assist levels of the driving assist mode determine the extent to which the control device 19 is involved in controlling the travel actions of the vehicle; in other words, the extent to which driver-performed manual operation is involved. The control device 19 realizes driving operation assistance determined by each assist level when autonomously controlling host vehicle travel by combining autonomous control of the travel speed using the autonomous speed control function and autonomous control of steering operations using the autonomous steering control function.

The assist levels of the present embodiment can be set on the basis of, for example, driving automation levels defined in SAE J3016: SEP2016, Taxonomy and Definitions for Terms Related to Driving Automation Systems for On-Road Motor Vehicle published by the Society of Automotive Engineers (SAE) of America. For example, assist level 0 defined by SAE is where the driver executes all driving tasks necessary for travel actions. Similarly, the assist level 1 is where the control device 19 continuously executes either autonomous speed control or autonomous steering control (but not both at the same time) in a specific limited area, and the driver executes either the travel speed of the host vehicle or steering of the host vehicle by steering (but not both at the same time). Similarly, the assist level 2 is where the control device 19 continuously executes autonomous speed control and autonomous steering control in a specific limited area, and the driver executes either the travel speed of the host vehicle or steering of the host vehicle by steering (but not both at the same time). Similarly, the assist level 3 is where the control device 19 continuously executes all driving tasks in a limited area. Similarly, the assist level 4 is where the control device 19 executes all driving tasks and the response to cases where continuing control is difficult is to continuously execute the tasks in a limited area. Similarly, the assist level 5 is a standard at which the control device 19 continuously and indefinitely executes all driving tasks and responds to cases where continuing control is difficult.

There are no particular limitations as to the assist level 1 set in the present embodiment; this assist level corresponds to the control device 19 controlling the travel speed of the host vehicle by autonomous speed control. Similarly, the assist level 2 corresponds to the control device 19 controlling steering of the host vehicle by autonomous steering control in addition to autonomous speed control. Hands-on mode and hands-off mode are included in the assist level 2. The term "hands-on mode" refers to a state in which autonomous steering control is not actuated as long as the driver is not holding the steering wheel, and the term "hands-off mode" refers to a state in which autonomous steering control actuates even if the driver takes their hands off the steering wheel. In addition, there are no particular limitations as to the assist level 2 set in the present embodiment; in this assist level, autonomous speed control and autonomous steering control for eyes-on mode are executed.

There are no particular limitations as to the assist level 3 set in the present embodiment; this assist level corresponds to the control device 19 executing autonomous speed control and autonomous steering control for eyes-on mode in addition to hands-off mode in the assist level 2. The term "eyes-on mode" refers to a state in which autonomous speed control and autonomous steering control do not activate when it is detected that the driver is monitoring the surroundings (particularly forward). In eyes-on mode, the driver is imaged by the interior camera and the driver line of sight and facial orientation are monitored. If the driver is not in a situation suited to monitoring of the surroundings, such as when the driver's line of sight is not forward or the driver's face is not oriented to the front, a forward caution warning is activated. The term "eyes-off mode" refers to a state in which the surroundings are monitored and autonomous speed control and autonomous steering control are activated by the control device 19 under certain conditions, even if it is not detected that the driver is monitoring the surroundings.

In the assist level 2 of the eyes-on mode, driving operations are controlled by the control device 19, but the driver monitors the surroundings and has the responsibility of driving. By contrast, in the assist level 3 of the eyes-off mode, the control device 19 also monitors the surroundings in addition to controlling driving operations, and the responsibility of driving is temporarily transferred to the control device 19.

Figure 4:
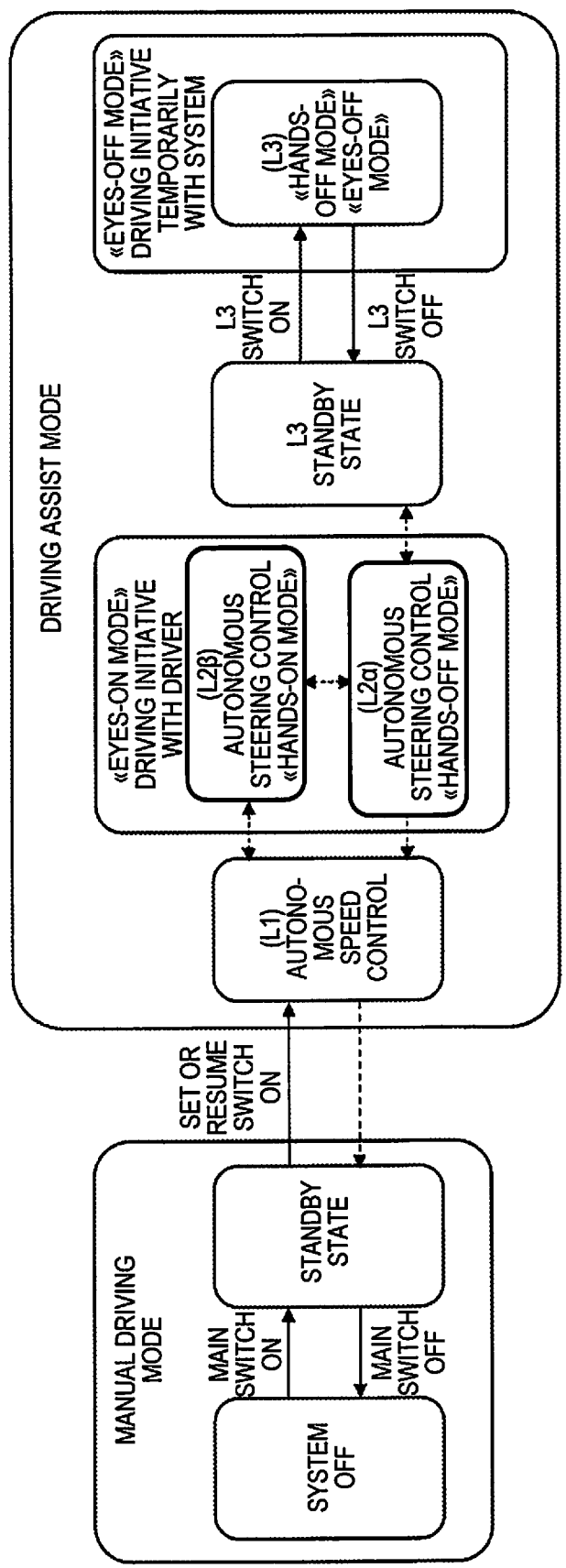
FIG. 4 is a block diagram of an outline of state transitions of the control device.

FIG. 4 is a block diagram of an outline of state transitions of the functions established in the control device 19. The term "system" shown in this diagram means an autonomous travel control system realized by the control device 19. When the main switch 171 in FIG. 2 is set to ON from the system OFF state shown in the diagram, the system enters a standby state. From this standby state, by setting the set-coast switch 173 or the resume acceleration switch 172 shown in FIG. 2 to ON, autonomous speed control in the driving assist mode (the assist level 1) is activated. As a result, the above-described constant speed control or vehicle-to-vehicle control is started, and the driver can cause the host vehicle to travel simply by operating the steering wheel without depressing the accelerator or brake. The system OFF state and standby state are equivalent to a manual driving mode in which the driver performs driving operations, and the system ON state is equivalent to a driving assist mode in which the driving operations by the driver are assisted by the autonomous travel control system realized by the control device 19.

When transitioning from the manual driving mode to the driving assist mode, the control device 19 controls the switching of the assist level in the driving assist mode. Assist level switching control is executed when the conditions for establishing each assist level are satisfied. There are no particular limitations as to the conditions for establishing switching control; these conditions include: road conditions and geographical conditions such as whether the host vehicle is traveling on a road exclusively for automotive vehicles, a road that is structurally separated from oncoming lanes, or a road for which there is a high-precision map, whether there are toll gates, exits, merges, intersections, or points where the number of lanes is reduced within a specified range ahead, whether lane markers on both sides of the host vehicle are detected, and whether the host vehicle is traveling near the center of the lane; as well as environmental conditions such as whether the host vehicle is traveling at or below the speed limit, whether the wipers are operating at a high speed (HI), whether the driver is holding the steering wheel, whether the acceleration pedal is being depressed, whether the driver has operated the brake, and whether the driver could be detected by a driver monitor camera; and other conditions.

For example, if the conditions for autonomous steering control are satisfied while the autonomous speed control (the assist level 1) shown in FIG. 4 is being executed, the system shifts to autonomous steering control with hands-on mode (the assist level 2β). If the conditions for the hands-off mode are satisfied while autonomous steering control with hands-on mode (the assist level 2β) is being executed, the system shifts to autonomous steering control with hands-off mode (the assist level 2α). By contrast, if, for example, the conditions for the hands-off mode are not met while autonomous steering control with hands-off mode (the assist level 2α) is being executed, hands-off mode is canceled and the system shifts to autonomous steering control with hands-on mode (the assist level 2β). In addition, if the conditions for autonomous steering control are not met while autonomous steering control with hands-on mode (the assist level 2β) is being executed, autonomous steering control is canceled and the system shifts to autonomous speed control (the assist level 1). When the conditions for autonomous speed control are no longer met while autonomous speed control (the assist level 1) is being executed, the system transitions from the driving assist mode to the manual driving mode and enters a standby state.

The transition from the assist level 1 to the assist level 2, the transition from the assist level 2 to the assist level 1, and the transition from the driving assist mode to the manual driving mode are autonomously switched and controlled by the control device 19 when conditions for satisfying switching control are met. However, in the transition from the assist level 2 to the assist level 3, as described above, the driving responsibility is temporarily transferred from the driver to the control device 19. Therefore, when the conditions for the hands-off mode and eyes-off mode are satisfied while hands-off mode and eyes-on mode (the assist level 2α) are being executed, the system immediately enters the standby state without transitioning to the assist level 3. When, for example, the driver presses an activation switch for the assist level 3 in the standby state, it is preferable that the system shifts to hands-off mode and eyes-off mode (the assist level 3). The pressing of the activation switch is not a limitation on the transition to the assist level 3; driver operation may be omitted, as necessary.

The system turns OFF when the main switch 171 is set to OFF in any of the following states: hands-off mode and eyes-off mode, autonomous steering control with hands-off mode, autonomous steering control with hands-on mode, autonomous speed control, and the standby state.

The control device 19 of the present embodiment autonomously controls the switching of the manual driving mode and the driving assist mode, or the assist level in the driving assist mode, when the satisfying conditions are met as described above. However, when operation of the steering wheel, the acceleration pedal, the brake pedal, etc., by the driver is detected while the driving assist mode is active, the control device 19 transfers driving responsibility including control of driving operations to the driver, and controls switching (overrides) from the driving assist mode to the manual driving mode. There are cases where overrides are performed intentionally on the basis of the driver's intention, but there are also cases where overrides are requested on the basis of a vehicle assessment, such as when an abnormality is detected in the autonomous travel control system.

The prior art citations given in the background-art citations indicate that in cases where switching is controlled from a first driving assist mode of hands-on mode or from a second driving assist mode of the hands-off mode to the manual driving mode, there is determined to be an override when both driver grip on a steering wheel and the steering torque equal to or greater than a preset threshold value are detected, and the system causes a transition from the first driving assist mode or the second driving assist mode to the manual driving mode. However, since there is determined to be an override due to the same conditions in both the first driving assist mode and the second driving assist mode, problems are encountered, such as that the transition to the manual driving mode is not performed smoothly, and conversely, an erroneous detection is made. Therefore, override determination is preferably performed in accordance with the travel assist level.

In view of the above circumstances, in the vehicle driving mode switching control device 1 according to the present embodiment, in cases where switching from the driving assist mode to the manual driving mode is controlled, an input value from the driver with respect to the steering wheel of the vehicle is detected, and when the input value from the driver is equal to or greater than a threshold value, control over switching from the driving assist mode to the manual driving mode is allowed (an override). In such instances, the threshold value for the driving assist mode in which the assist level is relatively high is set higher than the threshold value for the driving assist mode in which the assist level is relatively low. An embodiment of override control using the control device 19 is described below using FIGS. 5A to 8C.

Figure 5A:
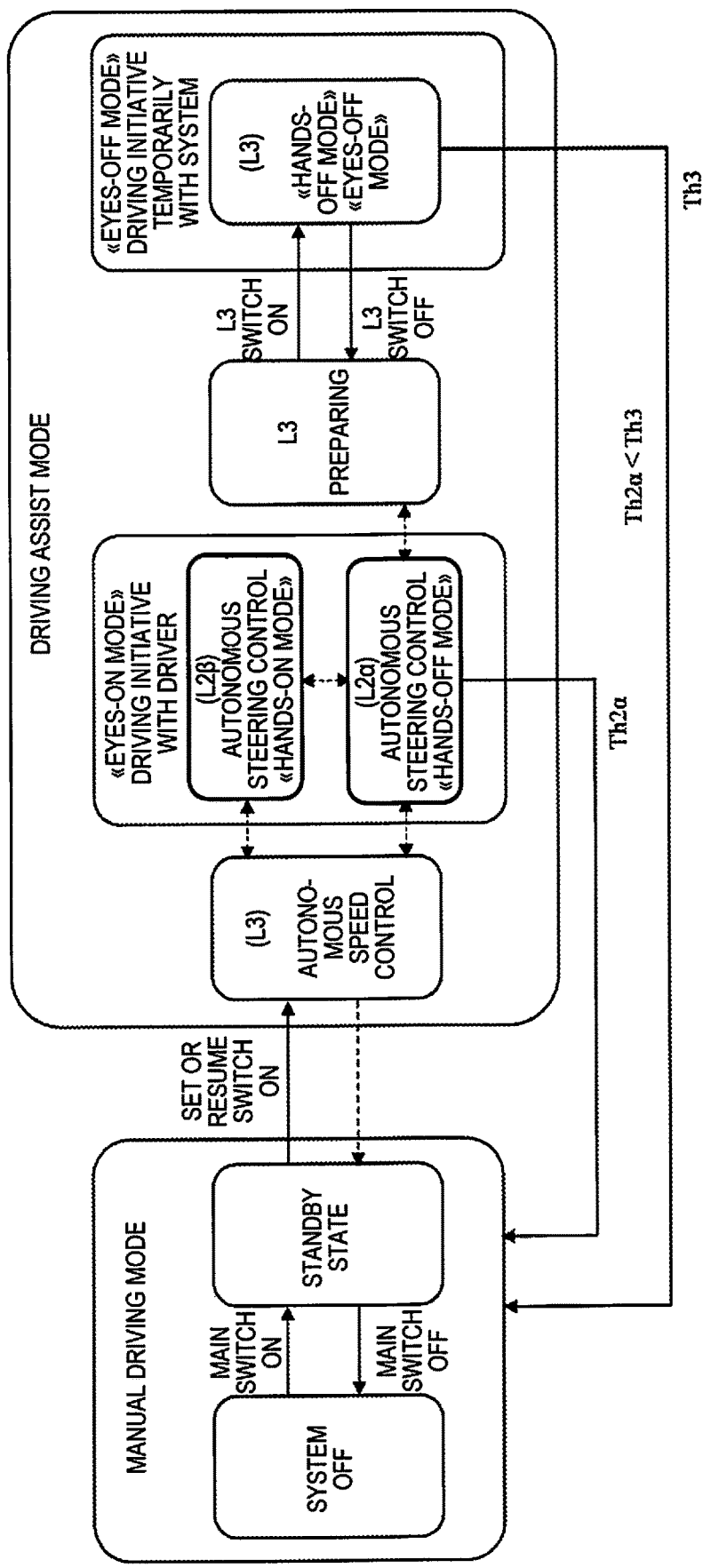
FIG. 5A is a diagram for describing a relationship between state transitions and threshold values of FIG. 4.

FIG. 5A is a diagram for illustrating a relationship between state transitions of the control device 19 and threshold values. In the present embodiment, the assist level 1, the assist level 2, and the assist level 3 are set in the driving assist mode, and furthermore, the assist level 2β of hands-on mode and the assist level 2α of the hands-off mode are set for the assist level 2. FIG. 5A shows the assist level becoming progressively higher from the left toward the right.

In cases of an override from the driving assist mode to the manual driving mode, the control device 19 detects input values from the driver for the steering wheel, the acceleration pedal, the brake pedal, etc., and determines whether or not to activate an override. Upon determining that an override is to be actuated, an override will be activated without being intended by the driver if the detected input value does not depend on the driver's intention, e.g., if there is an erroneous detection due to a mishap such as contact with clothing. In order to prevent such a situation, a threshold value Th is set at which it can be assessed that the driver has operated the steering wheel, accelerator pedal, brake pedal, etc., with the intention of taking over driving. When an input value exceeding the threshold value Th is detected, the control device 19 activates an override. In addition, the driving load on the driver during an override to the manual driving mode increases commensurately with a rise in the assist level of the driving assist mode. Therefore, in order to more accurately assess the driver's intention to take over, the threshold value Th is set higher commensurately with respect to an increase in the assist level.

In the example shown in Figure 5A, the assist level 2α and the assist level 3 are both for the hands-off mode, but in the assist level 2α of the eyes-on mode, the driver can monitor the surroundings and immediately take over driving operations. By contrast, in the assist level 3 of the eyes-off mode, since the driving responsibility has been temporarily transferred to the control device 19, the driver is not necessarily able to immediately take over driving operation. Therefore, a threshold value Th3 for cases of an override from the assist level 3 to the manual driving mode is set higher than a threshold value Th2α for cases of an override from the assist level 2α to the manual driving mode (TL2α<TL3).

By imposing a high input load on the threshold value Th3 of the assist level 3, it is possible to minimize erroneous detection and more accurately assess the driver's intention to take over. Conversely, at the threshold value Th2α of the assist level 2α, since the driver is able to immediately take over driving operations, the driver can smoothly take over if the input load is lower than the threshold value Th3 of the assist level 3. Thus, a threshold value Th is set for each assist level, and the threshold value for the driving assist mode in which the assist level is relatively high is set higher than the threshold value for the driving assist mode in which the assist level is relatively low, thereby making it possible to perform an override determination corresponding to the travel assist level.

As described above, there are also cases in which an override switching from the driving assist mode to the manual driving mode is intentionally carried out on the basis of the driver's intention, but there are also cases in which an override is requested on the basis of a vehicle assessment at times such as when a fault is detected in the system of the host vehicle. In cases in which an override is activated on the basis of a vehicle assessment, it is preferable that the driver be notified that control over switching from the driving assist mode to the manual driving mode will be executed.

There are no particular limitations as the form of the notification given to the driver; before an abnormality is detected in the system of the host vehicle and an override to the manual driving mode is executed, a warning message such as "please operate the steering wheel" requesting the driver to grip the steering wheel is displayed on the presentation device 16, such as, for example, a display provided on the instrument panel of the host vehicle, as shown in the lower right of FIG. 5B. After an override to the manual driving mode has been executed, a guidance message such as "switched to manual driving mode" is displayed, as shown in the lower left of FIG. 5B. In addition to these displays, actions such as outputting voice guidance and emitting a warning sound may be executed. Such actions can reduce driver anxiety when an override is activated on the basis of a vehicle assessment. These notifications to the driver are not an essential feature in the present invention, and may be omitted, as necessary.

Input values from the driver used in override determination can be detected from the circumstances in which the driver operates onboard devices such as the steering wheel, accelerator pedal, and brake pedal. In the present embodiment, an input value to the steering wheel by the driver is used for override determinations, but a configuration may also be adopted in which input values for the acceleration pedal, the brake pedal, a system activation switch, etc., are detected and an override is determined from these input values for a plurality of devices.

Figure 6:
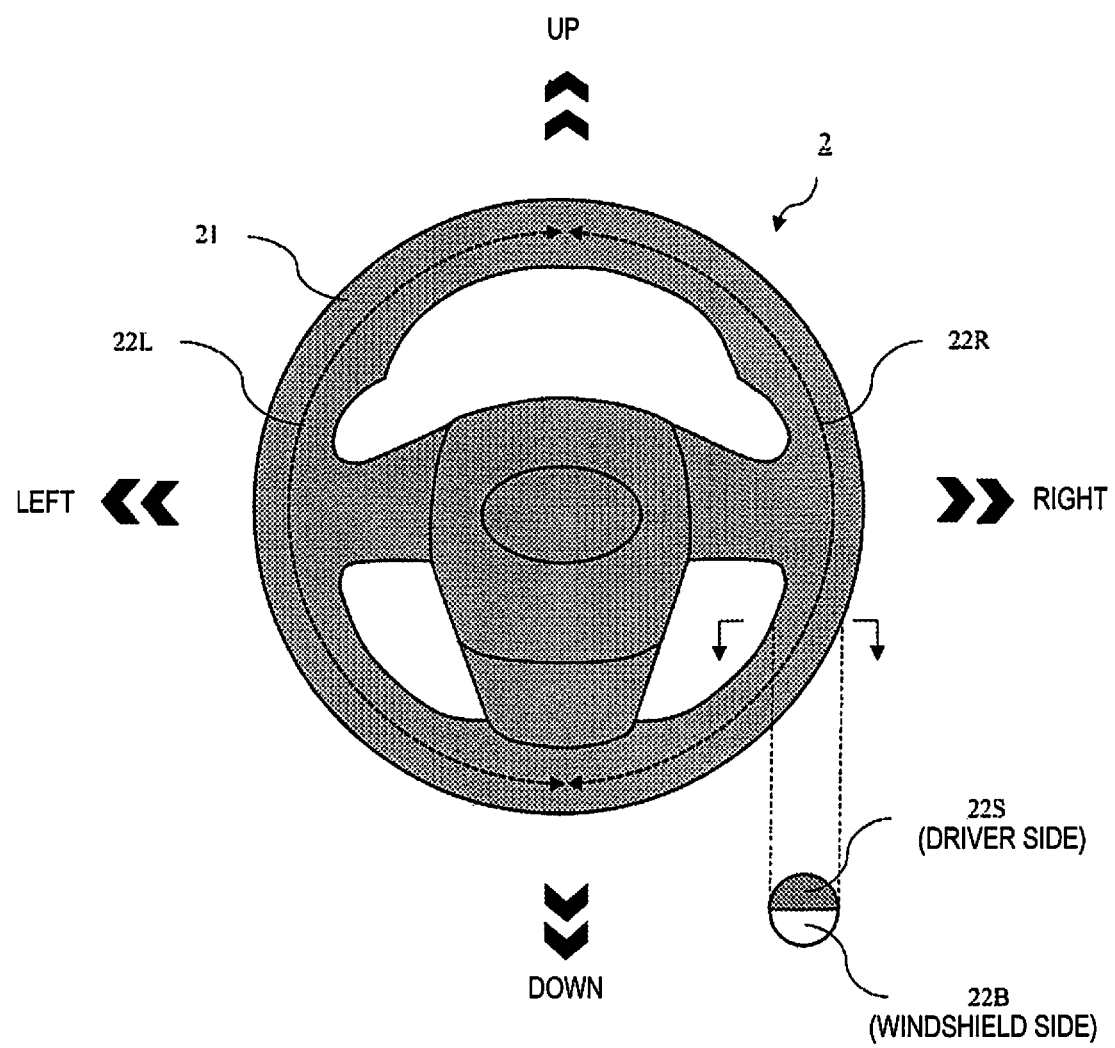
FIG. 6 is a front view and a cross-sectional view of a steering wheel provided with a sensor according to the present embodiment.

FIG. 6 is a front view and cross-sectional view of a steering wheel 2 according to the present embodiment. As shown in the front view of FIG. 6, a sheet-form sensor 22 such as a pressure-sensitive sensor is provided inside the steering wheel 2 of the present embodiment, and is disposed along a circumferential direction of a rim 21 (dashed-line arrows) in order to identify that the driver is in contact with, gripping, or otherwise handling the steering wheel. The sensor 22 is divided into a right sensor 22R located on the right side from the center of the steering wheel, and a left sensor 22L located on the left side from the center of the steering wheel. The right sensor 22R detects input values to the right, above, and below from the center of the steering wheel, and similarly, the left sensor 22L detects input values to the left, above, and below from the center of the steering wheel. The sensor 22 is also divided into a front surface sensor 22S located on a front side on which the steering wheel 2 faces the driver, and a back surface sensor 22B located on a back side facing the windshield, as shown in the cross-sectional view of FIG. 6. The front surface sensor 22S detects values of input on the front side of the steering wheel, and similarly, the back surface sensor 22B detects values of input on the back side of the steering wheel. In the present embodiment, the sensor 22 is arranged as being divided into four parts: left, right, front, and back, but this configuration is not provided by way of limitation on the arrangement of the sensor 22.

When an input value to the steering wheel by the driver is detected using the sensor 22 installed inside the steering wheel 2, the control device 19 identifies whether the driver is in a state of gripping or contacting the steering wheel 2. The contacting state involves merely touching the steering wheel 2, while the gripping state is a state of consciously gripping the steering wheel 2; therefore, the driver input load is higher in the gripping state than in the contacting state. On the basis of the identified state, the control device 19 determines whether or not the input value from the driver is equal to or greater than a threshold value Th. For example, in a case of executing an override from the assist level 2α to the manual driving mode, the input value is determined to be equal to or greater than the threshold value Th2α when it is identified that "one hand of the driver is in a contacting state," in order for the driver to smoothly take over with a low input load. By contrast, in cases of an override from the assist level 3 to the manual driving mode, the driver's intention to take over must be reliably confirmed; therefore, an input load higher than the threshold value Th2α at which "one hand of the driver is in a contacting state" is imposed, and whether or not the input value is equal to or greater than the threshold value Th3 is determined. The method of identifying the gripping state and the contacting state shall be described hereinafter.

Figure 7A:
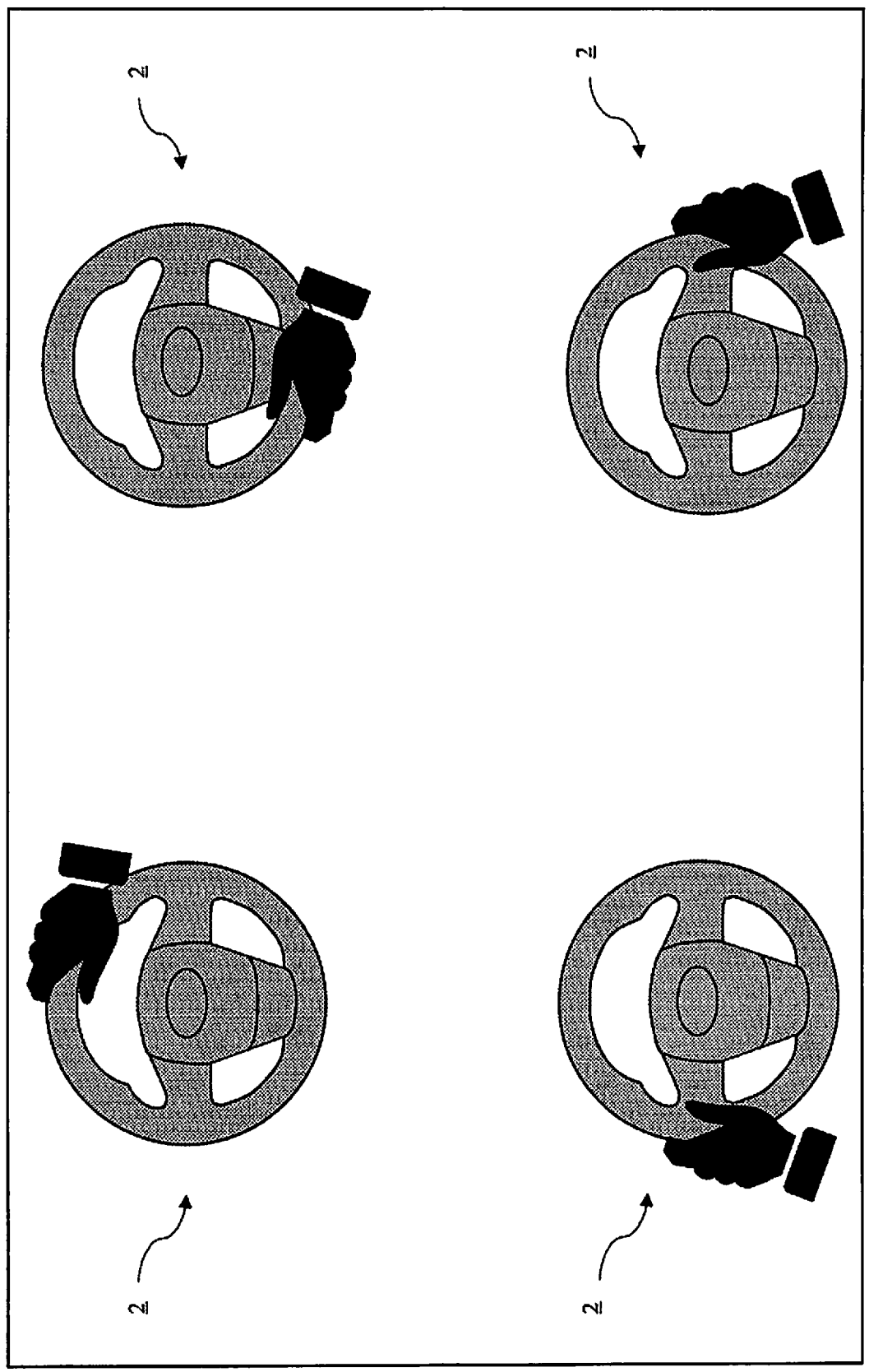
FIG. 7A is a diagram (part 1) for describing a relationship between a threshold value and an input value from a driver according to the present embodiment.

For example, if "at least one hand of the driver is in a gripping state," the control device 19 determines that the input value is equal to or greater than the threshold value Th3. When the driver is identified to be in a gripping state with any region above, below, left, or right on the steering wheel 2 as shown in FIG. 7A, at least one hand of the driver can be detected as being in a gripping state. If at least one hand is in a gripping state, it can be assessed that the driver is intentionally touching the steering wheel 2, and control can therefore be appropriately given to the driver even in the case of an override from the assist level 3 to the manual driving mode.

Figure 7B:
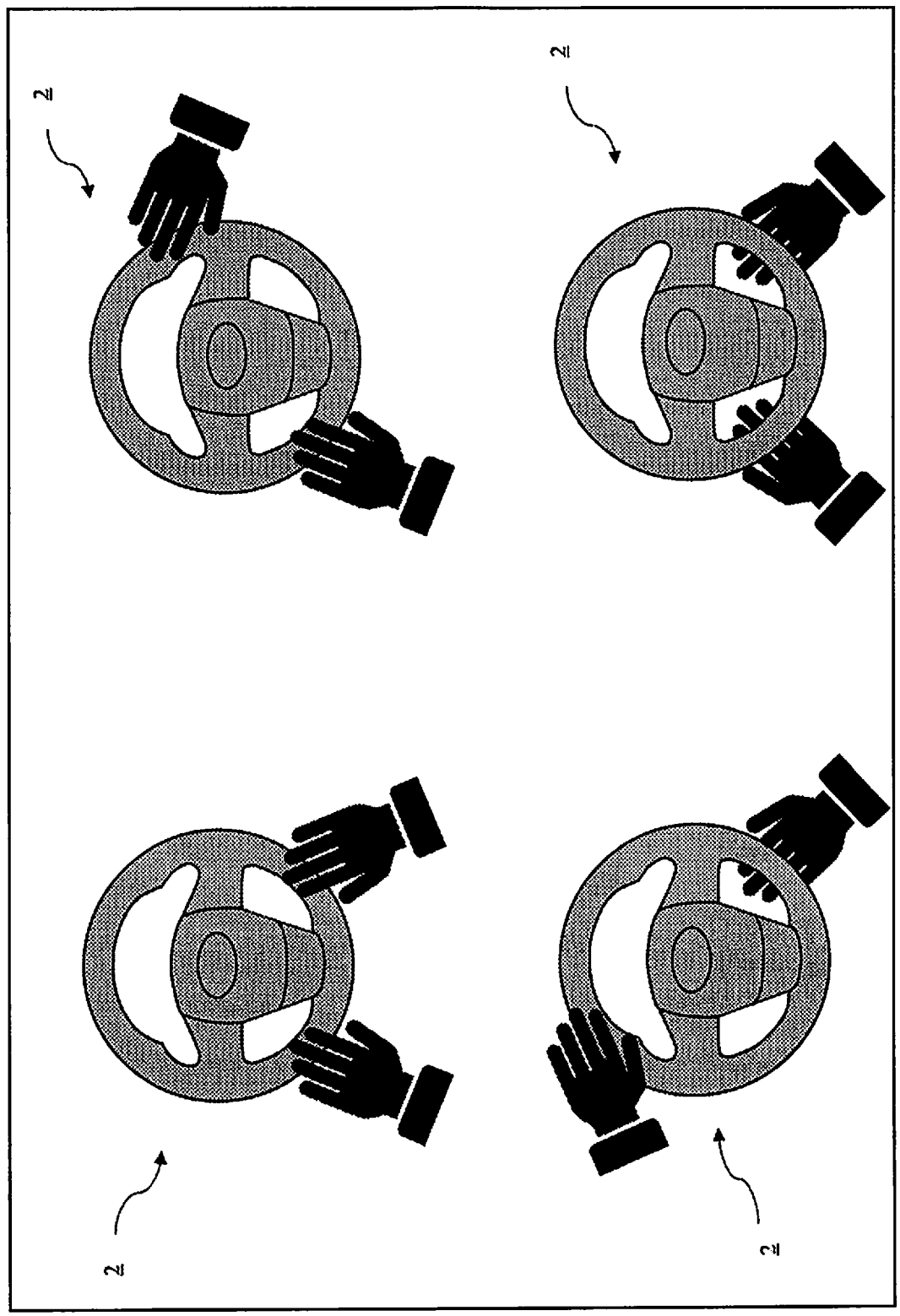
FIG. 7B is a diagram (part 2) for describing the relationship between a threshold value and an input value from the driver according to the present embodiment.

The control device 19 may determine that the input value is equal to or greater than the threshold value Th3 if "both hands of the driver are in a contacting state." When the driver is identified to be in a contacting state with two of regions above, below, left, or right on the steering wheel 2 as shown in FIG. 7B, both hands of the driver can be detected as being in a contacting state. If both hands of the driver are in a contacting state, override can be activated with the position of the steering wheel 2 being in a stable state. In addition, since the control device identifies whether or not the driver is in a contacting state in two areas, even if a contacting state is detected due to an input value that does not depend on the driver's intention, such as, for example, when the driver's knee is in contact with the lower area of the steering wheel 2, the input load will not be determined to be equal to or greater than the threshold value Th3 unless a contacting state is detected in areas other than the lower area. Therefore, it is possible to minimize determination of an input value equal to or greater than the threshold value Th3 due to erroneous detection of an input value that does not depend on the driver's intention. In the present embodiment, since the front surface sensor 22S and the back surface sensor 22B are installed inside the steering wheel 2, contacting states can be detected from both the front and back surfaces of the steering wheel 2, as shown in the lower left drawing of FIG. 7B.

Figure 7C:
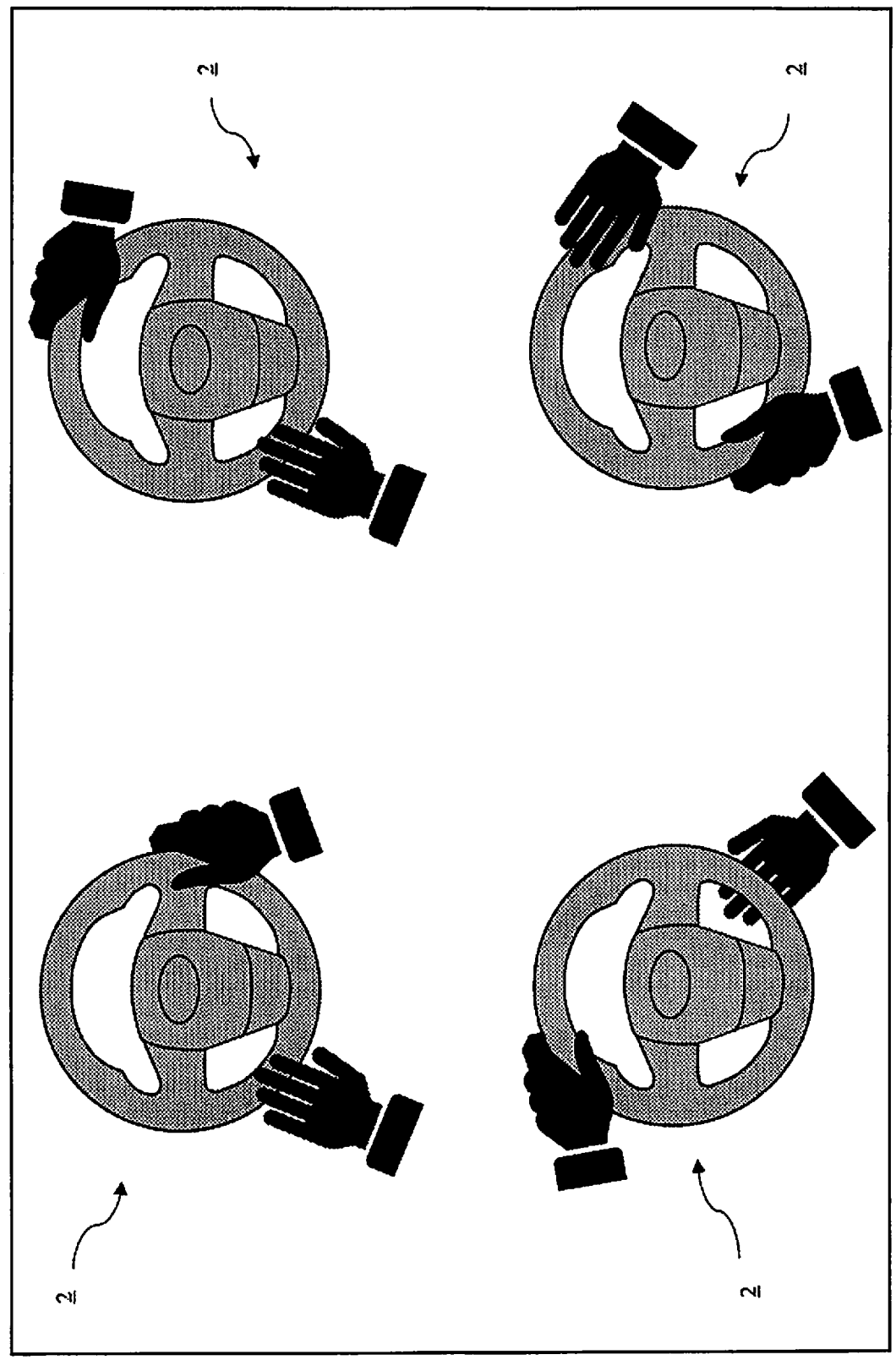
FIG. 7C is a diagram (part 3) for describing the relationship between a threshold value and an input value from the driver according to the present embodiment.

The control device 19 may determine that the input value is equal to or greater than the threshold value Th3 if "one hand of the driver is in a gripping state and the other hand is in a contacting state." When the driver is identified to be in a gripping state with any one of the regions above, below, left, or right on the steering wheel 2 and identified to be in a contacting state with another area as shown in FIG. 7C, the one hand of the driver can be detected to be in a gripping state and the other hand can be detected to be in a contacting state. Even if the input value identified with a contacting state is that does not depend on the driver's intention, such as in the case of, for example, contact from clothing, if the one hand is in a gripping state, it is assessed that the driver is touching the steering wheel 2 with the intention of taking over driving, and override can be appropriately activated. In the present embodiment, since the front surface sensor 22S and the back surface sensor 22B are installed inside the steering wheel 2, an input value can be detected from the back surface of the steering wheel 2 as well, as shown in the lower left drawing of FIG. 7C.

An area of contact between the driver and the steering wheel 2 can be used to identify whether the driver is in a gripping state or a state of contacting the steering wheel 2. For example, a gripping state is identified when the area of contact between the driver's fingers and an outer circumferential surface of the steering wheel, including the front surface sensor 22S and the back surface sensor 22B, is detected to be equal to or greater than a predetermined value. By contrast, a contacting state is identified when the area of contact with either the front surface sensor 22S or the back surface sensor 22B is detected to be equal to or greater than the predetermined value. No particular limitations are given with respect to the predetermined value; this value is a certain area suitable for detection as an input value from the driver, such as, for example, an area equivalent to a width of a first finger (thumb), or an area equivalent to a combined width of a second finger (index finger) and a third finger (middle finger). In addition, to minimize erroneous detections, different values may be used as the predetermined values for the front surface sensor 22S and the back surface sensor 22B, such as, for example, using an area equivalent to the width of the first finger for the predetermined value of the front surface sensor 22S, and an area equivalent to the combined width of the second finger and the first finger for the predetermined value of the back surface sensor 22B.

Figure 8A:
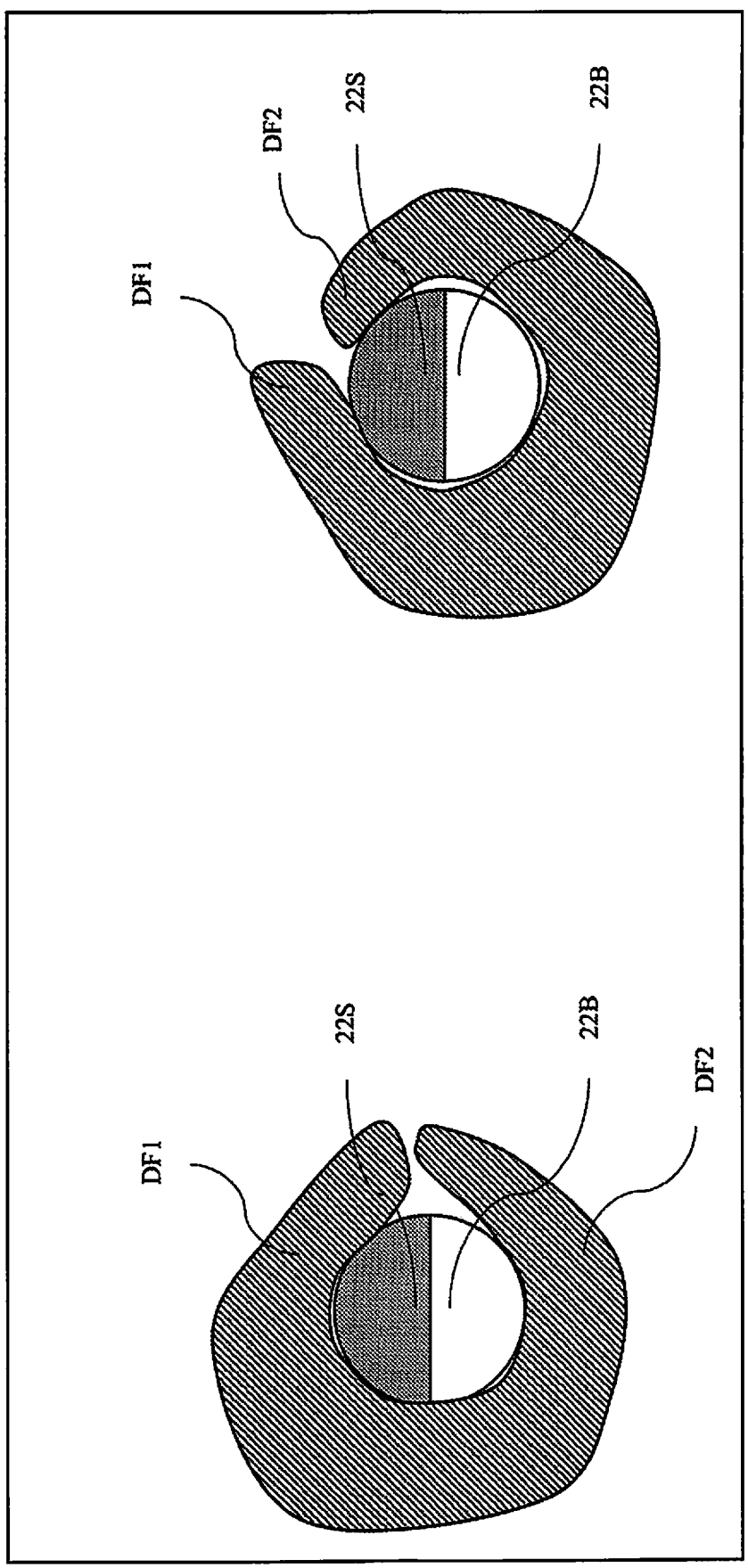
FIG. 8A is a diagram (part 1) for describing an example of a method of identifying input values from the driver according to the present embodiment.

FIG. 8A is a drawing of an example in which the driver is identified to be in a state of gripping the steering wheel 2. In the left drawing of FIG. 8A, an area of contact of the driver's first finger DF1 is detected by the front surface sensor 22S and an area of contact of the second finger DF2 is detected by the back surface sensor 22B; therefore, the control device 19 identifies the driver to be in a gripping state. Similarly, in the right drawing of FIG. 8A, area of contacts of the driver's first finger DF1 and second finger DF2 are detected by the front surface sensor 22S and an area of contact of the second finger DF2 is detected by the back surface sensor 22B; therefore, a gripping state is identified.

Figure 8B:
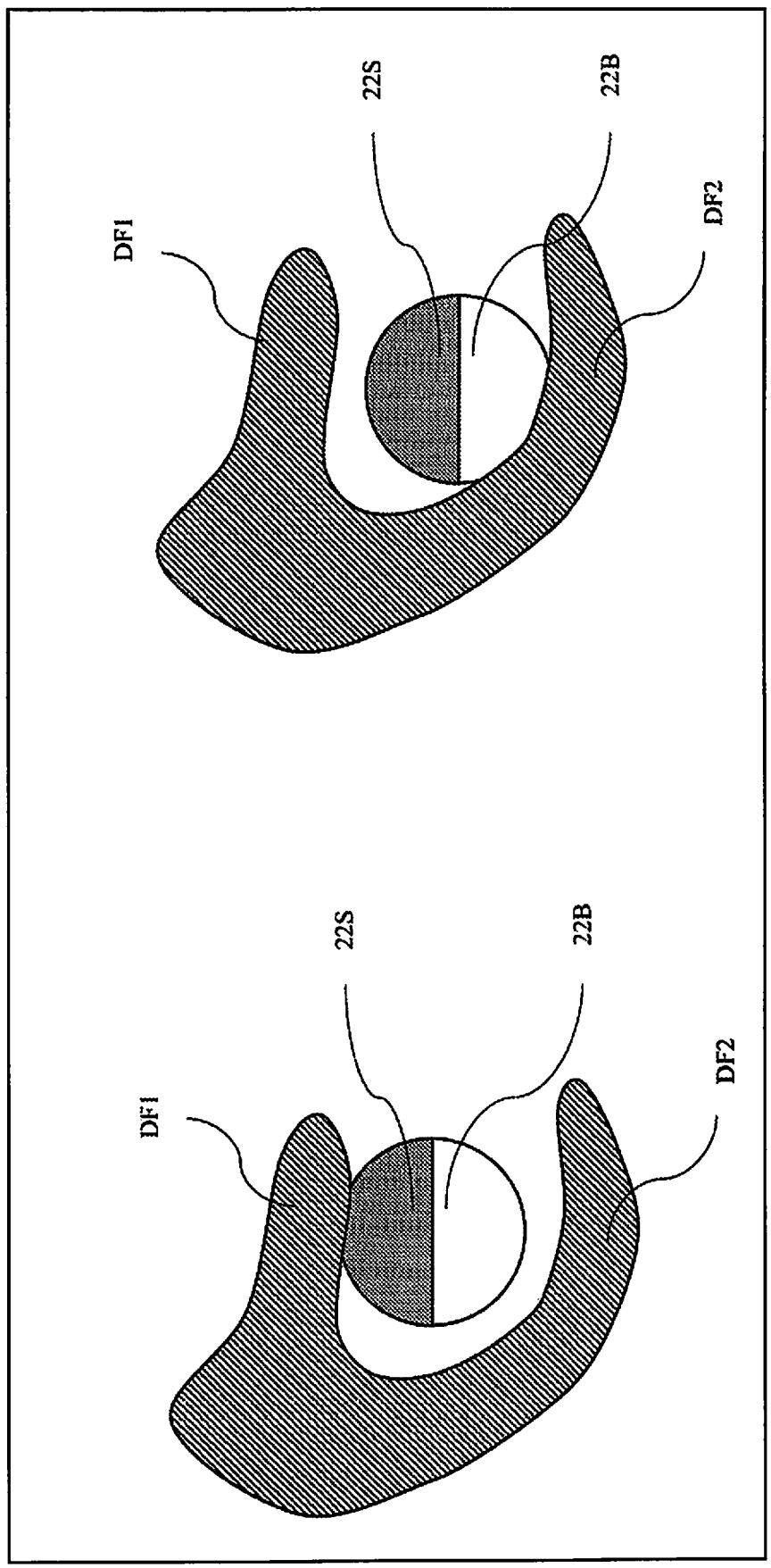
FIG. 8B is a diagram (part 2) for describing an example of a method of identifying input values from the driver according to the present embodiment.

FIG. 8B is a drawing of an example in which the driver is identified to be in a state of gripping the steering wheel 2. In the left drawing of FIG. 8B, an area of contact of the driver's first finger DF1 is detected by the front surface sensor 22S and an area of contact is not detected by the back surface sensor 22B; therefore, the control device 19 identifies the driver to be in a contacting state. Similarly, in the right drawing of FIG. 8B, an area of contact is not detected by the front surface sensor 22S and an area of contact of the driver's second finger DF2 is detected by the back surface sensor 22B; therefore, a contacting state is identified. On the other hand, when, for example, there is no contact with the front surface sensor 22S and an edge of the driver's clothing is in contact with the back surface sensor 22B, a contacting state is not identified if the area of contact of the clothing is not equal to or greater than a predetermined value. In this case, a gripping state is also not identified because an area of contact is not detected by the front surface sensor 22S. Thus, area of contacts are detected by the front surface sensor 22S and the back surface sensor 22B of the steering wheel 2 and whether there is a gripping state or a contacting state is identified on the basis of the area of contacts detected by these sensors 22; therefore, accuracy of identification with respect to the input value from the driver can be improved.

A pressure at which the driver grips the steering wheel 2 may be used to identify whether the driver is in a gripping state or a state of contacting the steering wheel 2. In the event of an override from the assist level 3 to the manual driving mode, the driver's intention to take over driving must be accurately confirmed; therefore, for example, when a gripping pressure that is less than a predetermined value is detected, a contacting state is identified, and when a strong gripping pressure that is equal to or greater than the predetermined value is detected, a gripping state is identified. No particular limitations are given with respect to the predetermined value, but this value is the gripping pressure when the driver grips the steering wheel 2 in at least a normal travel state.

Figure 8C:
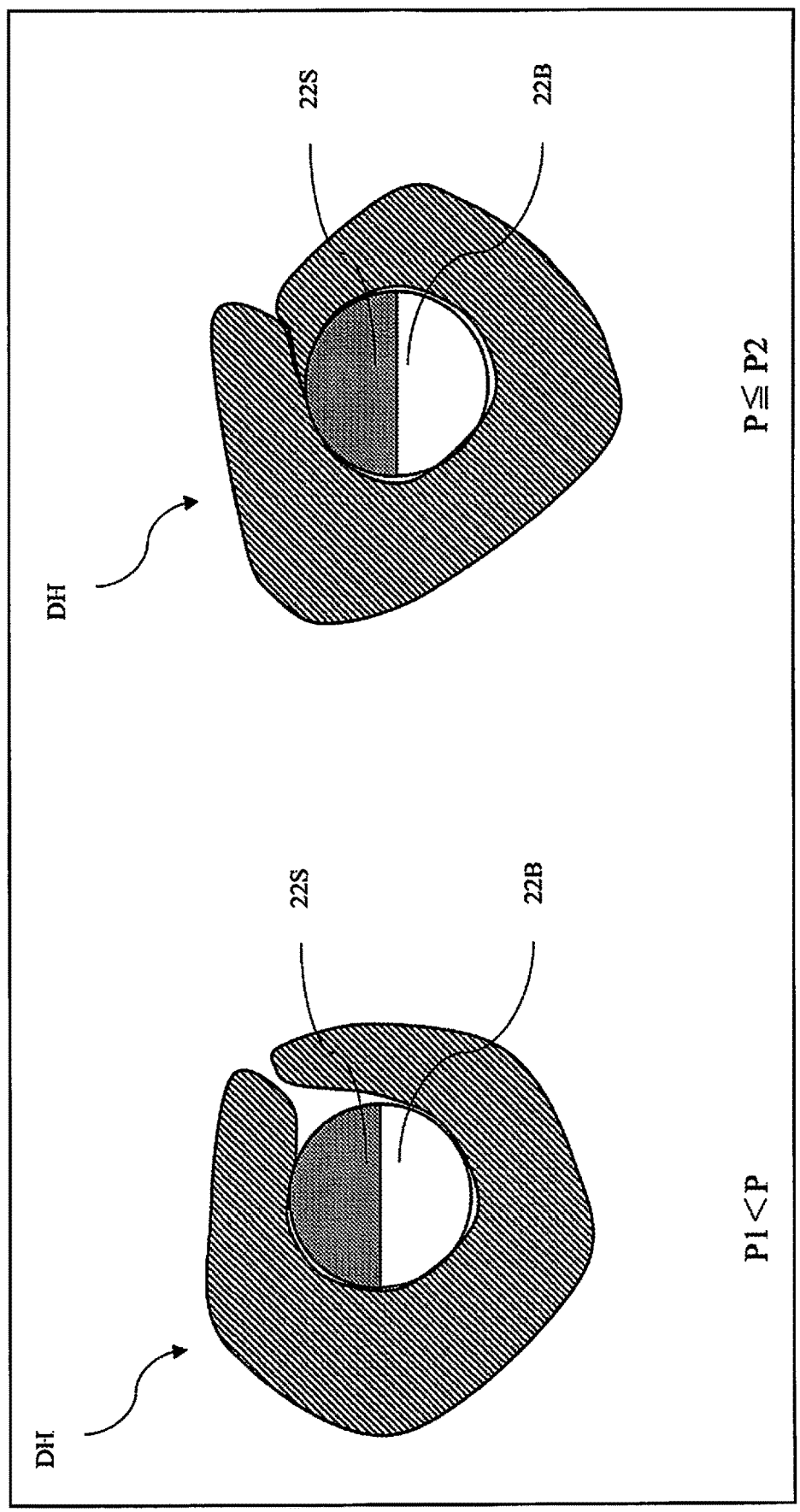
FIG. 8C is a drawing for describing another example of a method of identifying input values from the driver according to the present embodiment.

The left drawing of FIG. 8C shows an example in which the driver is identified to be in a state of contacting the steering wheel 2, and the right drawing shows an example in which the driver is identified to be in a gripping state. In the left drawing of FIG. 8C, a gripping pressure P1 from the driver's hand DH is detected by the front surface sensor 22S and the back surface sensor 22B of the steering wheel 2. Since the gripping pressure P1 is less than a predetermined value P, the control device 19 identifies the driver to be in a contacting state. By contrast, in the right drawing of FIG. 8C, a gripping pressure P2 from the driver's hand DH is detected by the front surface sensor 22S and the back surface sensor 22B of the steering wheel 2. Since the gripping pressure P2 is greater than a predetermined value P, the control device 19 identifies the driver to be in a gripping state. When a gripping pressure stronger than the normal travel state is detected and the driver is identified to be in a gripping state, it can be assessed that the driver is displaying an intention to take over driving. Thus, by identifying whether the driver is in a gripping state or a contacting state on the basis of the gripping pressure on the steering wheel 2, it is possible to confirm the driver's intention to take over and to perform an override.

Figure 9:
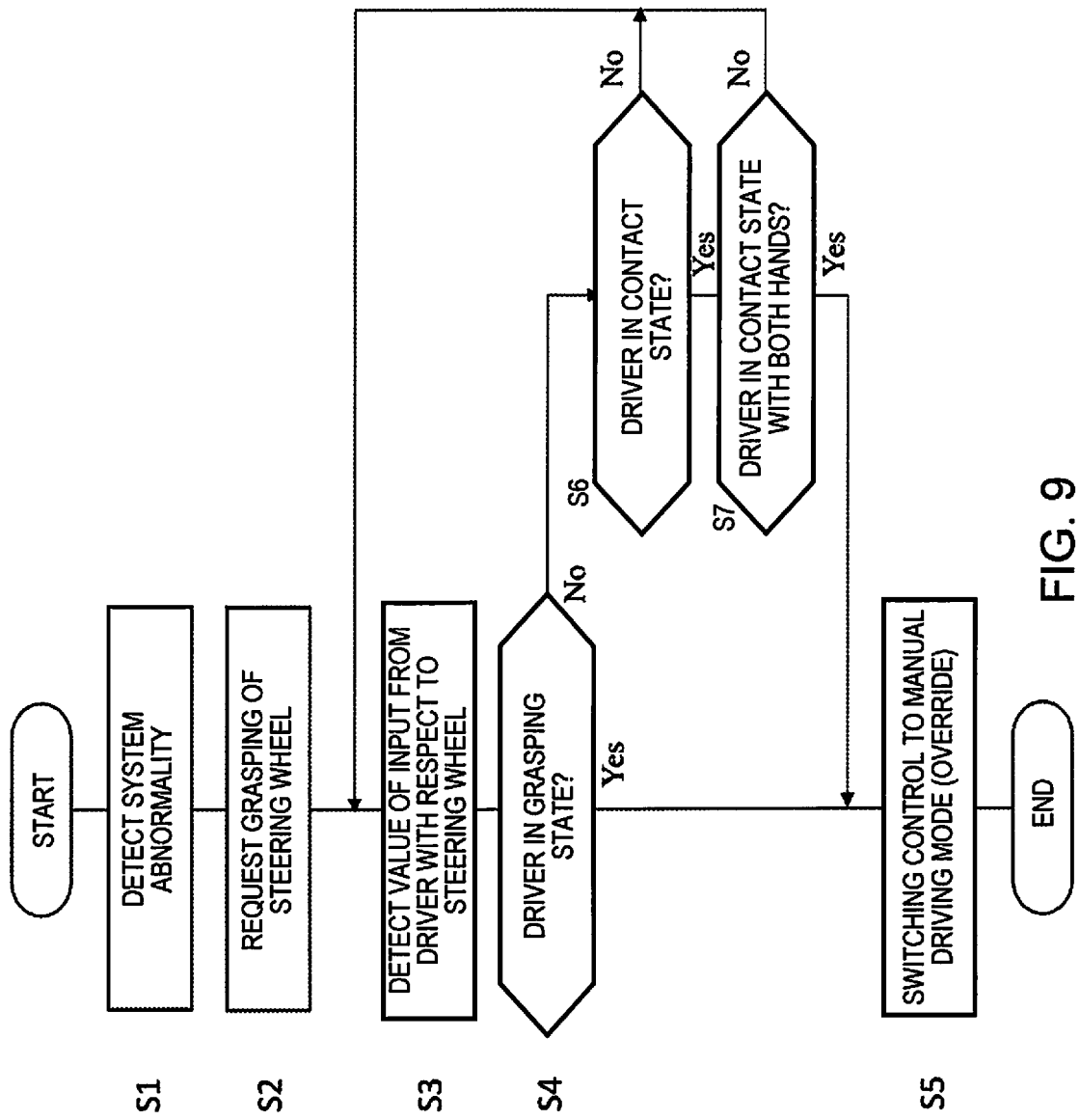
FIG. 9 is a flowchart of an example of an override control process executed by the driving mode switching control device of FIG. 1.

Next, an override control process of the present embodiment shall be described with reference to FIG. 9. FIG. 9 is a flowchart of an example of an override control process executed by the driving mode switching control device 1 of the present embodiment. The override control process described below is executed at predetermined time intervals by the driving mode switching control device 1. Described below is a case in which the driving assist mode in hands-off mode and eyes-off mode (the assist level 3) is executed by the autonomous travel control function of the control device 19. The threshold value Th3 at which an override is determined is set at an input load higher than the threshold value Th2α at which "the driver is in a contacting state with one hand."

First, when an abnormality in the autonomous travel control system is detected in step S1, the control device 19 causes the instrument panel display or the like to display a notification requesting that the driver grip the steering wheel 2 in step S2.

When an input value from the driver with respect to the steering wheel 2 is detected by the sensors 22 installed inside the steering wheel 2 in step S3, in the next step S4, the control device 19 identifies whether or not the driver is in a state of gripping the steering wheel 2. When the driver is identified to be in a state of gripping the steering wheel 2, the process advances to step S5. By contrast, when the driver is identified to not be in a state of gripping the steering wheel 2, the process advances to step S6.

When the driver is identified to not be in a state of gripping the steering wheel 2 as a result of step S4, the control device 19 identifies whether or not the driver is in a state of contacting the steering wheel 2 in step S6. When the driver is identified to be in a state of contacting the steering wheel 2, the process advances to step S7. By contrast, when the driver is identified to be in a state of contacting the steering wheel 2, the input value from the driver is equal to or greater than the threshold value Th3; therefore, the process returns to step S3 and the process from this step onward is repeated.

When the driver is identified to be in a state of contacting the steering wheel 2 as a result of step S6, the control device 19 identifies whether or not the driver is in a state of contacting the steering wheel 2 using both hands in step S7. When the driver is identified to be in a contacting state using both hands, the process advances to step S5. By contrast, when the driver is identified to not be in a contacting state using both hands, the input value from the driver is not equal to or greater than the threshold value Th3; therefore, the process returns to step S3 and the process from this step onward is repeated.

When the driver is identified to be in a state of gripping the steering wheel 2 as a result of step S4 and also when the driver is identified to be in a state of contacting the steering wheel 2 using both hands as a result of step S7, the control device 19 determines that the input value from the driver is equal to or greater than the threshold value Th3 and the process advances to step S5. A gripping state may be determined in step S4 when the input value is equal to or greater than the threshold value Th3 if the driver is in a gripping state using at least one hand.

In the next step S5, the control device 19 performs an override from the driving assist mode at the assist level 3 to the manual driving mode.

As described above, according to the driving mode switching control method and the vehicle driving mode switching control device 1 of the present embodiment, the threshold value of a driving assist mode in which the assist level is relatively high is set higher than the threshold value of a driving assist mode in which the assist level is relatively low in a vehicle driving mode switching control method in which a switch is made from the driving assist mode, in which a driving operation performed by a driver is assisted by autonomous travel control having a plurality of assist levels, to the manual driving mode, in which the driver performs the driving operation. An input value from the driver with respect to the steering wheel 2 of the host vehicle V1 is detected, and when the input value from the driver is equal to or greater than a threshold value, a switch is made from the driving assist mode to the manual driving mode. It is thereby possible to perform an override determination corresponding to the travel assist level.

In addition, according to the driving mode switching control method and the vehicle driving mode switching control device 1 of the present embodiment, a request for the driver to grip the steering wheel 2 is outputted when a switch is made from the driving assist mode to the manual driving mode, and it is therefore possible to reduce driver anxiety when an override is activated on the basis of a vehicle assessment.

In addition, according to the driving mode switching control method and the vehicle driving mode switching control device 1 of the present embodiment, when the driver is identified to be in a state of gripping the steering wheel 2 in at least one of the regions above, below, left, or right from the center on the outer circumferential surface of the steering wheel 2 in the driving assist mode in which the assist level is relatively high, the input value from the driver is determined to be equal to or greater than a threshold value Th. It is thereby possible to appropriately allow the driver to take over even in an override from the driving assist mode in which the assist level is relatively high to the manual driving mode.

According to the driving mode switching control method and the vehicle driving mode switching control device 1 of the present embodiment, when the driver is identified to be in a state of contacting the steering wheel 2 in two of the regions above, below, left, or right on the outer circumferential surface of the steering wheel 2 in the driving assist mode in which the assist level is relatively high, the input value from the driver is determined to be equal to or greater than a threshold value Th. It is thereby possible to activate an override in a state in which the position of the steering wheel 2 is stable. It is also possible to minimize the incidence at which it is determined that the input value is equal to or greater than the threshold value Th due to erroneous detection of an input value that does not depend on the driver's intention.

In addition, according to the driving mode switching control method and the vehicle driving mode switching control device 1 of the present embodiment, the input value from the driver is determined to be equal to or greater than a threshold value Th when the driver is identified to be in a state of gripping the steering wheel 2 in one of the regions above, below, left, or right on the outer circumferential surface of the steering wheel 2 in the driving assist mode in which the assist level is relatively high, and the driver is identified to be in a state of contacting the steering wheel 2 in another one of the regions above, below, left, or right. It is thereby possible to assess that the driver is intentionally touching the steering wheel 2 and to appropriately activate an override.

In addition, according to the driving mode switching control method and the vehicle driving mode switching control device 1 of the present embodiment, the identification of whether the driver is in a gripping state or a state of contacting the steering wheel 2 is that there is a gripping state when the area of contact between the driver and the outer circumferential surface of the steering wheel 2, including the front surface facing the driver and the back surface facing the windshield of the vehicle, is equal to or greater than a predetermined value, and that there is a contacting state when the area of contact on either the front surface or the back surface is equal to or greater than a predetermined value. It is thereby possible to improve accuracy of identification with respect to the input value from the driver.

In addition, according to the driving mode switching control method and the vehicle driving mode switching control device 1 of the present embodiment, the identification of whether the driver is in a gripping state or a state of contacting the steering wheel 2 is that a gripping state is identified when the gripping pressure exerted by the driver on the steering wheel 2 is equal to or greater than a predetermined value, and a contacting state is identified when the gripping pressure is less than the predetermined value; therefore, it is possible to confirm the driver's intention to take over and to perform an override determination.

The embodiment described above is described in order to facilitate understanding of the present invention, and is not described in order to limit the present invention. Therefore, the elements disclosed in the above embodiment is intended to include all design changes and equivalents that fall within the technical scope of the present invention.

The invention claimed is:

1. A vehicle driving mode switching control method in which a switch is made from a driving assist mode in which a driving operation performed by a driver is assisted by autonomous travel control having a plurality of assist levels to a manual driving mode in which the driver performs the driving operation, the vehicle driving mode switching control method comprising:
    setting a threshold value higher for the driving assist mode in which the assist level is a first level than for a threshold value for the driving assist mode in which the assist level is a second level, the first level providing a higher assist level relative to the second level;
    detecting an input value from the driver with respect to a steering wheel of a host vehicle;
    determining the input value from the driver to be equal to or greater than the threshold value while in the driving assist mode in which the assist level is the first level, when either at least one hand of the driver is identified to be in a state of gripping the steering wheel or both hands of the driver are identified to be in a state of contacting the steering wheel; and
    switching from the driving assist mode to the manual driving mode when the input value from the driver is equal to or greater than the threshold value.

2. The vehicle driving mode switching control method according to claim 1, further comprising
    outputting a request for the driver to grip the steering wheel when switching from the driving assist mode in which the assist level is the first level or the second level to the manual driving mode.

3. The vehicle driving mode switching control method according to claim 1, wherein
    the input value from the driver is determined to be equal to or greater than the threshold value when the driver is identified to be in the state of gripping the steering wheel in at least one region above, below, left, or right of center on an outer circumferential surface of the steering wheel while in the driving assist mode in which the assist level is the first level.

4. The vehicle driving mode switching control method according to claim 1, wherein
    the input value from the driver is determined to be equal to or greater than the threshold value when the driver is identified to be in the state of contacting the steering wheel in two regions including above, below, left, or right from center on an outer circumferential surface of the steering wheel while in the driving assist mode in which the assist level is the first level.

5. The vehicle driving mode switching control method according to claim 1, wherein
    the input value from the driver is determined to be equal to or greater than the threshold value when the driver is identified to be in the state of gripping the steering wheel in one region above, below, left, or right from center on an outer circumferential surface of the steering wheel and the driver is identified to be in the state of contacting the steering wheel on another of the regions above, below, left, or right while in the driving assist mode in which the assist level is the first level.

6. The vehicle driving mode switching control method according to claim 3, wherein
    identification of whether the driver is in the state of gripping or the state of contacting the steering wheel includes
    identifying the driver is in the gripping state when an area of contact between the driver and the outer circumferential surface of the steering wheel, including a front surface facing the driver and a back surface facing a windshield of the vehicle, is equal to or greater than a predetermined value, and
    identifying the driver is in the contacting state when the area of contact with either the front surface or the back surface is equal to or greater than a predetermined value.

7. The vehicle driving mode switching control method according to claim 3, wherein
    identification of whether the driver is in the state of gripping or the state of contacting the steering wheel includes
    identifying the driver is in the gripping state when a gripping pressure exerted by the driver on the steering wheel is equal to or greater than a predetermined value, and
    identifying the driver is in the contacting state when the gripping pressure is less than a predetermined value.

8. A vehicle driving mode switching control device comprising:
    a processor configured to switch from a driving assist mode in which a driving operation performed by a driver is assisted by autonomous travel control having a plurality of assist levels to a manual driving mode in which the driver performs the driving operation,
    the processor being configured to:
    set a threshold value higher for the driving assist mode in which the assist level is a first level than for a threshold value for the driving assist mode in which the assist level is a second level, the first level providing a higher assist level relative to the second level;
    detect an input value from the driver with respect to a steering wheel of a host vehicle;
    determine the input value from the driver to be equal to or greater than the threshold value while in the driving assist mode in which the assist level is relatively high, when either at least one hand of the driver is identified to be in a state of gripping the steering wheel or both hands of the driver are identified to be in a state of contacting the steering wheel; and switch from the driving assist mode to the manual driving mode when the input value from the driver is equal to or greater than the threshold value.

* * * * *